US009574882B2

(12) United States Patent
Schilling et al.

(10) Patent No.: US 9,574,882 B2
(45) Date of Patent: Feb. 21, 2017

(54) AUTOMOTIVE OBD-II DEVICE GENERATING NAVIGATIONAL INFORMATION (71) Applicant: Autoliv ASP, Inc., Ogden, UT (US)

(72) Inventors: Robert Schilling, Londonderry, NH (US); David F. Jordan, Danville, NH (US); Kevin G. Rochford, Windham, NH (US); Scott A. Nist, Hartland, MI (US); Albert Serpa, Westford, MA (US); Martin Tierney, Reading, MA (US); Stephen Profit, Framingham, MA (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 14/491,190

(22) Filed: Sep. 19, 2014

(65) Prior Publication Data

US 2016/0084657 A1  Mar. 24, 2016

(51) Int. Cl.
*G01C 21/20* (2006.01)
*G07C 5/00* (2006.01)
*G01C 21/16* (2006.01)
*G01C 21/36* (2006.01)

(52) U.S. Cl.
CPC .......... *G01C 21/20* (2013.01); *G01C 21/165* (2013.01); *G01C 21/36* (2013.01); *G01C 21/3688* (2013.01); *G07C 5/00* (2013.01)

(58) Field of Classification Search
USPC .............. 701/408, 409, 412, 4, 72; 340/5.61; 342/357.2
See application file for complete search history.

(56) References Cited

U.S. PATENT DOCUMENTS

| 6,272,349 B1 | 8/2001 | McGrath et al. | 455/456 |
| 6,466,172 B1 | 10/2002 | Ryken et al. | 343/700 MS |
| 7,962,271 B1 * | 6/2011 | Thompson | G01M 15/04 324/713 |

(Continued)

FOREIGN PATENT DOCUMENTS

FR    2931285    11/2009    ........... G08G 1/0969

OTHER PUBLICATIONS

An Implementation of Android-Based Mobile Virtual Instrument for Telematics Applications; Heng-Fa Teng ; Meng-Jil Wang ; Cheng-Min Lin; Innovations in Bio-inspired Computing and Applications (IBICA), 2011 Second International Conference on DOI: 10.1109/IBICA.2011.81; Publication Year: 2011, pp. 306-308.*

(Continued)

*Primary Examiner* — Cuong H Nguyen
(74) *Attorney, Agent, or Firm* — Christopher P. Maiorana, PC (57) ABSTRACT A system includes a processor circuit and a computer readable storage medium. The processor circuit may be configured to plug into an on board diagnostic connector of a vehicle. The computer readable storage medium generally embodies computer executable instructions. The computer executable instructions, when executed by the processor circuit, enable the processor circuit to communicate with one or more busses of the vehicle and to communicate navigational information to an auxiliary device.

20 Claims, 7 Drawing Sheets (56) References Cited

U.S. PATENT DOCUMENTS

| | | | | |
|---|---|---|---|---|
| 8,160,767 | B1* | 4/2012 | Thompson | G07C 5/0808 123/486 |
| 8,200,389 | B1* | 6/2012 | Thompson | G07C 5/0808 340/439 |
| 8,239,093 | B1* | 8/2012 | Thompson | G07C 5/0808 701/30.9 |
| 8,606,500 | B2* | 12/2013 | Veliu et al. | 701/408 |
| 8,612,091 | B2* | 12/2013 | Thompson | G07C 5/0808 701/32.9 |
| 8,727,056 | B2* | 5/2014 | Nagda | 180/171 |
| 2006/0205347 | A1 | 9/2006 | Karabinis | 455/12.1 |
| 2008/0303693 | A1* | 12/2008 | Link, II | G08G 1/096741 340/905 |
| 2008/0319665 | A1* | 12/2008 | Berkobin et al. | 701/213 |
| 2009/0066586 | A1 | 3/2009 | Rao et al. | 343/702 |
| 2009/0234582 | A1* | 9/2009 | Figueroa | G01C 21/12 701/472 |
| 2011/0012775 | A1 | 1/2011 | Richards et al. | 342/146 |
| 2011/0109522 | A1 | 5/2011 | Merrick et al. | 343/872 |
| 2011/0153209 | A1 | 6/2011 | Geelen | 701/209 |
| 2011/0313656 | A1 | 12/2011 | Mignen et al. | 701/207 |
| 2012/0010778 | A1 | 1/2012 | Akatsuka | 701/33 |
| 2012/0142397 | A1 | 6/2012 | Jordan et al. | 455/556.1 |
| 2013/0103253 | A1* | 4/2013 | Thompson | G01M 15/04 701/32.9 |
| 2013/0212659 | A1* | 8/2013 | Maher et al. | 726/6 |
| 2014/0149032 | A1 | 5/2014 | Barrett et al. | 701/409 |

OTHER PUBLICATIONS iOS based speed estimation for the video car recorder system; Chen-Chia Chuang; Jin-Tsong Jeng; Wen-June Wang; Shun-Feng Su; Dong-Han Lin; Computational Cybernetics (ICCC), 2013 IEEE 9th International Conference on; Year: 2013; pp. 61-65, DOI: 10.1109/ICCCyb.2013.6617562.*

Remote prognosis, diagnosis and maintenance for automotive architecture based on least squares support vector machine and multiple classifiers; Mostafa Anwar Taie et al., Industrial Electronics and Applications (ICIEA), 2015 IEEE 10th Conference on; Year: 2015; pp. 690-695, DOI: 10.1109/ICIEA.2015.7334197.*

Autonomous tour guide robot by using ultrasonic range sensors and QR code recognition in indoor environment; Seok Ju Lee; Jongil Lim; Girma Tewolde; Jaerock Kwon; IEEE International Conference on Electro/Information Technology; Year: 2014; pp. 410-415, DOI: 10.1109/EIT.2014.6871799.*

Remote prognosis, diagnosis and maintenance for automotive architecture based on least squares support vector machine and multiple classifiers;Mostafa Anwar Taie; Mohammed Diab; Mohamed ElHelw; Ultra Modern Telecommunications and Control Systems and Workshops (ICUMT), 2012 4th International Congress on; Year: 2012;pp. 128-134, DOI: 10.1109/I.*

* cited by examiner

PIN ASSIGNMENTS:
1. MAKE/MODEL SPECIFIC
2. J1850+
3. MAKE/MODEL SPECIFIC
4. CHASSIS GROUND
5. SIGNAL GROUND
6. CAN (J2284) HIGH
7. ISO 9141 K LINE
8. MAKE/MODEL SPECIFIC

9. MAKE/MODEL SPECIFIC
10. J1850-
11. MAKE/MODEL SPECIFIC
12. MAKE/MODEL SPECIFIC
13. MAKE/MODEL SPECIFIC
14. CAN (J2284) LOW
15. ISO 9141 L LINE
16. BATTERY POWER

AUTOMOTIVE OBD-II DEVICE GENERATING NAVIGATIONAL INFORMATION

FIELD OF THE INVENTION

The present invention relates to global navigation satellite systems (GNSSs) generally and, more particularly, to a method and/or apparatus for implementing an automotive OBD-II device capable of generating navigational information.

BACKGROUND OF THE INVENTION

An automotive global positioning system/global navigation satellite system (GPS/GNSS) with dead reckoning (DR) capability provides accuracy in urban canyons and low signal environments. Conventional mobile smart devices such as cell phones and tablets use GPS/GNSS position information for a variety of applications.

However, the accuracy of the GPS/GNSS position information provided by the smart devices can be reduced when traveling in urban canyons and low signal environments. Battery life of the mobile devices is reduced when on board GPS/GNSS is enabled, especially when the on board GPS/GNSS unit is hunting for satellite signals in urban canyons and low signal environments.

It would be desirable to implement an automotive OBD-II device capable of generating navigational information.

SUMMARY OF THE INVENTION

The present invention concerns a system including a processor circuit and a computer readable storage medium. The processor circuit may be configured to plug into an on board diagnostic connector of a vehicle. The computer readable storage medium generally embodies computer executable instructions. The computer executable instructions, when executed by the processor circuit, enable the processor circuit to communicate with one or more busses of the vehicle and to communicate navigational information to an auxiliary device.

The objects, features and advantages of the present invention include providing an automotive OBD-II device capable of generating navigational information that may (i) be plugged into an on board diagnostic (e.g., OBD-II) socket (or port) of a vehicle, (ii) communicate navigational information derived from GPS/GNSS positional information with or without dead reckoning (DR) to an auxiliary device (e.g., cell phone, tablet, smart device. etc.), (iii) support one or more wired communications protocols (e.g., Ethernet, USB, etc.), (iv) support one or more wireless communication protocols (WiFi, BLUETOOTH, etc.), (v) communicate with an application (commonly referred to as an App) running on the auxiliary device, (vi) allow auxiliary devices to obtain highly accurate location information using vehicle data with or without on board GPS/GNSS, (vii) save battery life, and/or (viii) be implemented in a dongle.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
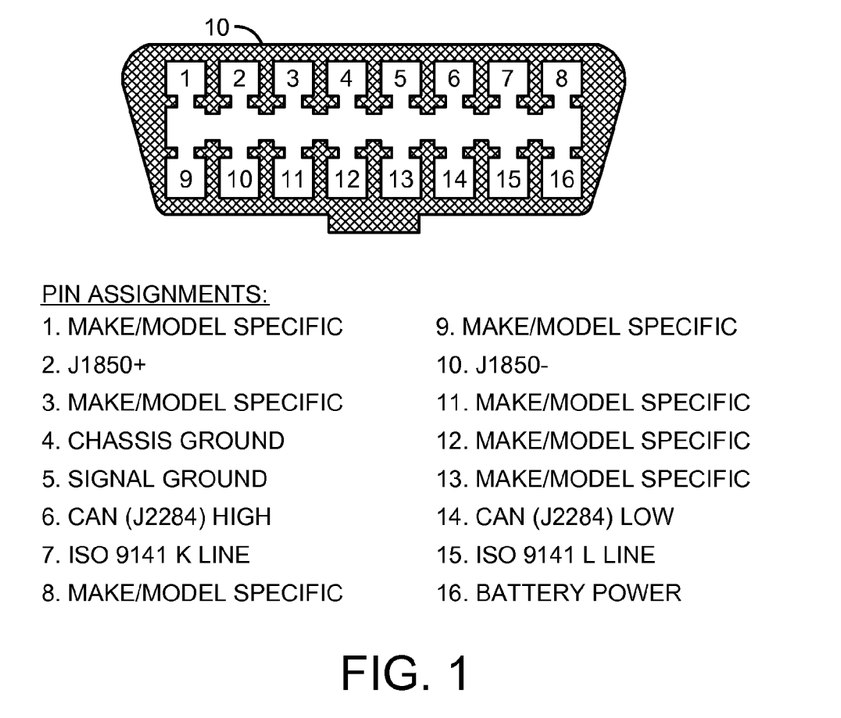
FIG. 1 is a diagram illustrating an OBD-II compliant on board diagnostic port connector.

In various embodiments, a system and/or method generally allows mobile smart devices to take advantage of information available on one or more vehicle data busses to obtain highly accurate location information. In some embodiments, navigational information derived from global positioning system/global navigation satellite system (GPS/GNSS) positional information, with or without dead reckoning (DR), may be taken from the vehicle using an on board diagnostic connector (or port) and transmitted to an application running on the mobile smart devices (e.g., cell phone, tablet, etc.). In some embodiments, a device plugged into the on board diagnostic (e.g., OBD-II) connector (or port) includes a GPS/GNSS chipset and uses motion data from the one or more vehicle data busses to obtain highly accurate GPS DR location information, which is then transmitted to the application running on the mobile smart devices. In some embodiments, the device may also include a 3-axis gyroscope or accelerometer for generating DR and three-dimensional (3D) DR information when a vehicle does not have such sensors available via the on board diagnostic port. Referring to FIG. 1, a diagram is shown illustrating an on board diagnostic port connector 10. The port connector 10 may be implemented as an OBD-II standard diagnostic port, where OBD stands for "On Board Diagnostics" and II indicates the second attempt at standardization across makes and models of vehicles. The OBD-II specification represents a collection of industry and governmental standards for communicating diagnostic information from passenger vehicles. The port connector 10 is generally located within three feet of the driver and is accessible without tools. The port connector 10 may contain up to 16 pins, numbered 1-8 from left to right across the top of the connector and numbered 9-16 from left to right across the bottom of the connector.

Pins 1, 3, 8, 9, and 11-13 may be used for make/model (proprietary) specific purposes. The remaining pins provide connections for power and different types of physical communication links. For example, pins 2 and 10 may be used to support SAE J1850-PWM or SAE-J1850-VFW protocols, pins 6 and 14 may be used to support controller area network (CAN) bus HIGH and LOW, and pins 7 and 15 may be used to support ISO K and L lines. The CAN pair (pins 6 and 14) may use either standard ISO 15765 or extended ISO 15765 protocols. The ISO pair (pins 7 and 15) may use either ISO 9141 or ISO 14230 protocols. However, other protocols may be implemented, including, but not limited to, ISO 15764-4

(CAN), ISO 14230-4 (Keyword Protocol 2000), ISO 9141-2 (Asian, European, Chrysler vehicles), SAE J1850 VPW (GM vehicles), SAE J1850 PWM (Ford vehicles), SAE J2411 (GM LAN, single wire CAN), and Ford MSC (medium speed CAN).

Regardless of the protocol, information available on the vehicle busses generally includes, but is not limited to, Parameter IDs (PIDs) and diagnostic trouble codes (DTCs). Parameter IDs generally represent real time measurements for various sensors (e.g., RPM, ignition timing, wheel clicks, etc.). Diagnostic trouble codes report problems detected by an electronic (or engine) control unit (ECU). In one example, data on a particular vehicle bus may be obtained by monitoring the appropriate pins of the ODB-II port. In some vehicles, all of the vehicle busses relay data between one another making a direct connection to a particular bus superfluous.

Figure 2:
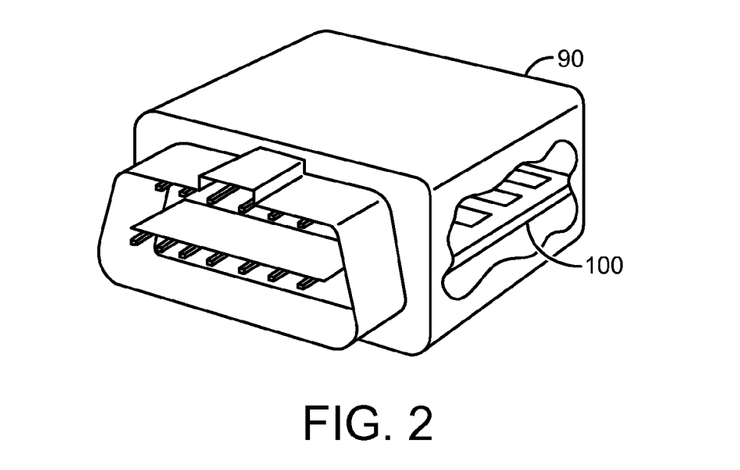
FIG. 2 is a diagram illustrating a dongle 90 housing a device in accordance with an embodiment of the invention.

Referring to FIG. 2, a diagram of a dongle 90 is shown illustrating an example of a device in accordance with an example embodiment of the invention. The term dangle as used herein refers to a piece of hardware that attaches to an electronic device and, when attached, enables additional function(s). In various embodiments, the dangle 90 is configured to connect to the on board diagnostic (e.g., OBD-II) connector (or socket or port) of a vehicle. Such connectors are standard on all 1996 and newer vehicles sold in the United States of America (USA). The on board diagnostic port is typically located in an area below the driver's side of the dashboard. The dangle 90 generally comprises a integrated connector and housing. A printed circuit board (PCB) 100 is disposed within the dangle 90 and electrically connected with a number of contacts (pins) of the integrated connector.

Figure 3A:
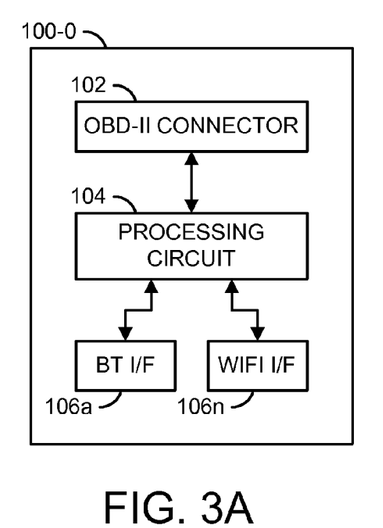
FIGS. 3A-3D are diagrams illustrating example implementations of the device of FIG. 2 in accordance with example embodiments of the invention.

Referring to FIGS. 3A-3D, diagrams of a number of example implementations of the PCB 100 of FIG. 2 are shown illustrating example devices in accordance with example embodiments of the invention. In various embodiments of the PCB 100 (e.g., 100-0, 100-1, 100-2, and 100-3), an OBD-II compliant connector 102 is coupled to a processing circuit 104 and the processing circuit 104 is coupled to one or more interface (I/F) circuits 106a-106n implementing one or more wireless protocols (e.g., IEEE 802.11 a/b/g/n "WiFi", IEEE 802.15.1 BLUETOOTH, IEEE 802.15.4 ZIGBEE, etc.) and/or one or more wired protocols (e.g., Universal Serial Bus, Ethernet, etc.). Referring to FIG. 3A, the processing circuit 104 of the PCB 100-0 is enabled to obtain global positioning system/global navigation satellite system (GPS/GNSS) positional information with or without dead reckoning (DR) from the vehicle using the on board diagnostic (e.g., OBD-II) connector (or port).

For example, the PCB 100-0 may be enabled to pull messages regarding vehicle position, heading, and speed off of one or more of the vehicle busses. In one example, these messages may be published on the busses in vehicles using a GPS module as described in co-pending U.S. Ser. No. 14/231,987, filed Apr. 1, 2014, which is incorporated by reference. The processing circuit 104 on the PCB 100-0 reformats the position data (e.g., using a National Marine Electronics Association (NMEA) standard format) and transmits the navigational information to an application program running on one or more auxiliary and/or mobile devices (e.g., cell phone, tablet, etc.) using at least one of the wireless and/or wired interfaces 106a-106n.

Figure 3B:
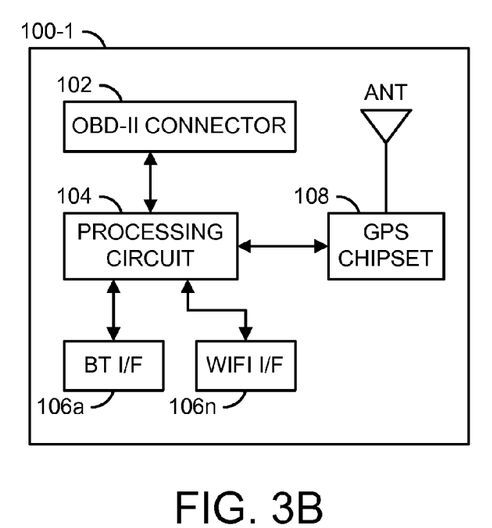
Figure 3C:
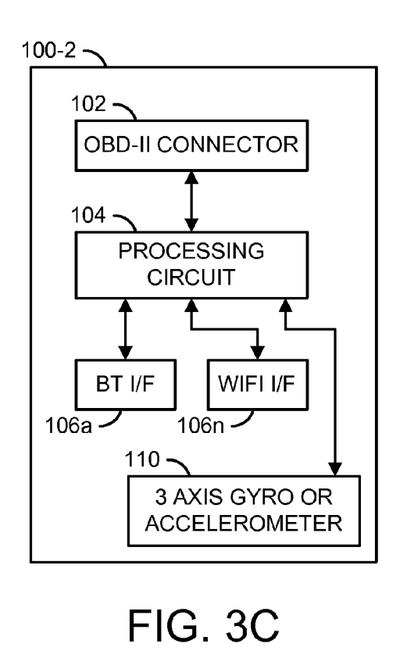
Figure 3D:
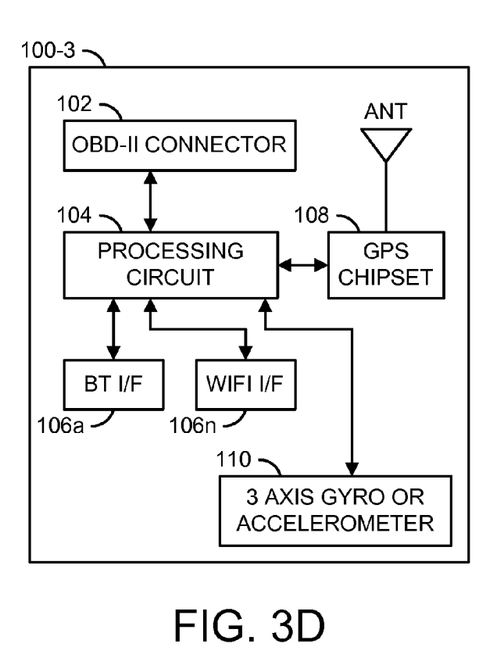

Referring to FIG. 3B, the processing circuit 104 of the PCB 100-1 is further connected to a GPS/GNSS chipset 108 (and antenna) and is enabled to generate navigational information derived from global positioning system/global navigation satellite system (GPS/GNSS) data, with or without dead reckoning (DR) positional information, using motion-related information pulled from one or more of the vehicle busses via the on board diagnostic (e.g., OBD-II) connector (or port). For example, the PCB 100-1 may pull messages from sensors (e.g., ABS wheel, wheel click, gyro, speed, etc.) off the one or more vehicle busses and use the data from the messages along with the GPS chipset 108 and/or a 3-axis gyro 110 to provide navigational information with or without DR or 3D DR position solutions to the auxiliary devices (e.g., using a National Marine Electronics Association (NMEA) standard format) via at least one of the wireless and/or wired interfaces 106a-106n. In some embodiments (e.g., PCB 100-2 in FIG. 3C and PCB 100-3 in FIG. 3D), a 3-axis gyroscope or accelerometer 110 may be added for use in vehicles without built-in gyroscopes or accelerometers.

Figure 4:
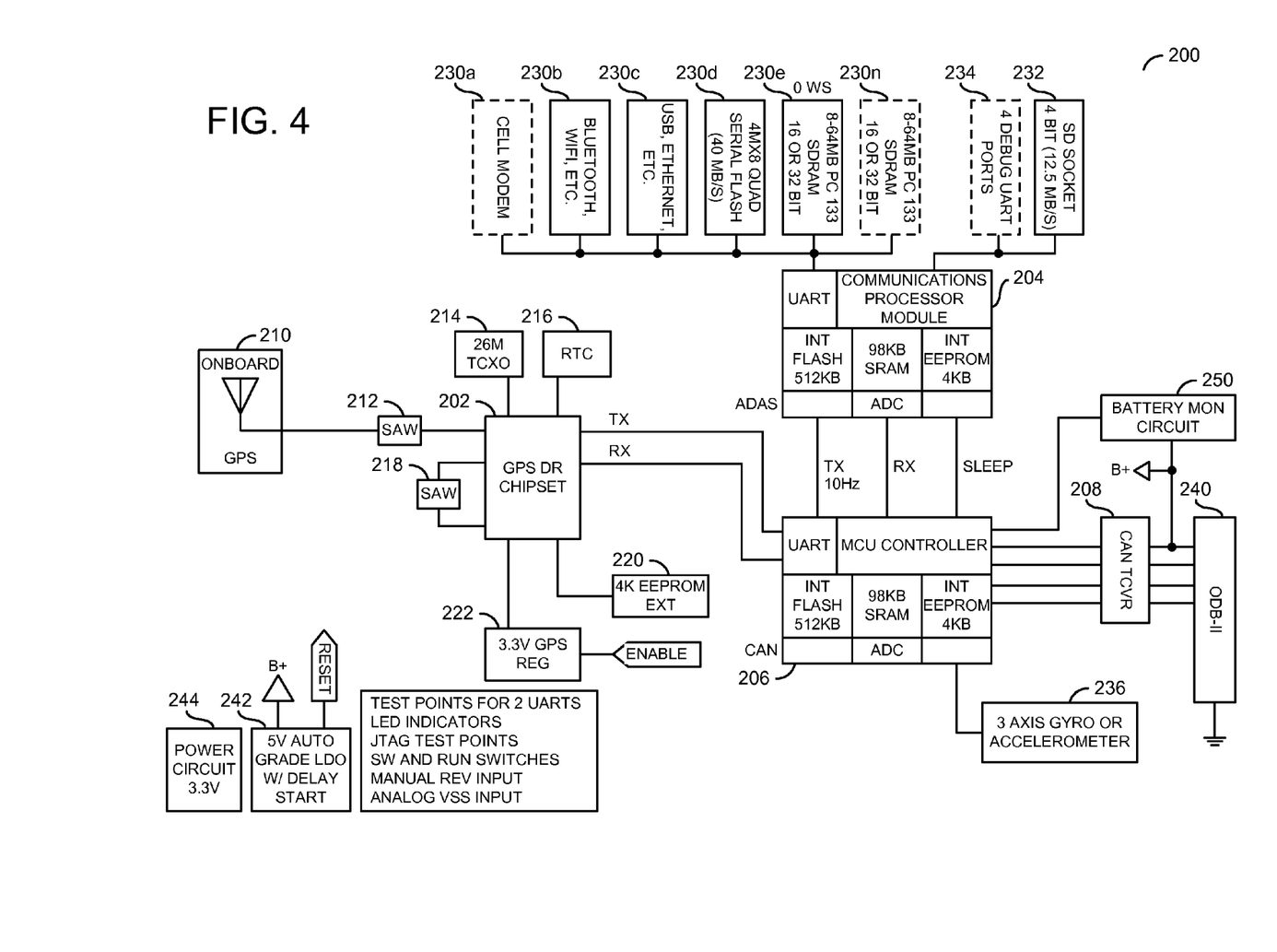
FIG. 4 is a block diagram illustrating an example architecture in accordance with an embodiment of the invention.

Referring to FIG. 4, a block diagram of a system 200 is shown illustrating an example architecture in accordance with an example embodiment of the present invention. Depending on the make and model of a vehicle, various parts of the system 200 may be implemented as part of the vehicle electronics or as part of the dongle electronics (as illustrated in FIG. 3 above). The system 200 may implement an integrated global navigation satellite system (GNSS) receiver and electronic horizon module in accordance with an example embodiment of the invention. The system 200 may comprise a block (or circuit) 202, a block (or circuit) 204, a block (or circuit) 206, a block (or circuit) 208, a block (or circuit) 210, a block (or circuit) 212, a block (or circuit) 214, a block (or circuit) 216, a block (or circuit) 218, a block (or circuit) 220, a block (or circuit) 222, a number of blocks (or circuits) 230a-230n, a block (or circuit) 232, a block (or circuit) 234, a block (or circuit) 236, a block (or circuit) 240, a block (or circuit) 242, a block (or circuit) 244, and a block (or circuit) 250. The blocks 202-250 may be mounted or connected to at least one printed circuit board (PCB) substrate.

In various embodiments, the block 202 may be implemented as a global positioning system (GPS) chip set. In one example, the block 202 may comprise an independently certified drop-in module. In some embodiments, the block 202 may be implemented with a Dead Reckoning (DR) GPS chip set. However, other chipsets compliant with one or more other global navigation satellite systems (GNSSs), for example, GPS (USA), GLONASS (Russia), Beidou (China), Compass (China), Galileo (Europe), etc., may be implemented accordingly to meet the design criteria of a particular implementation. The term global navigation satellite system (GLASS) is used generically and is intended to encompass any satellite-aided navigation system. The block 204 may be implemented, in one example, as a communications processor module. The block 206 may be implemented, in one example, as a microcontroller (MCU). In one example, the blocks 204 and 206 may be implemented using separate processors. In another example, the blocks 204 and 206 may be implemented using a single processor. The block 208 may be implemented, in one example, as a controller area network (CAN) transceiver.

The block 210 may be implemented as an on board GPS/GNSS antenna. In one example, the block 210 may comprise a printed circuit board substrate mounted GPS/GNSS antenna. In one example, the antenna 210 may be implemented as a microstrip patch antenna.

The block 212 may be implemented as a first surface acoustic wave (SAW) filter configured to couple the block 210 to the block 202. The block 214 may be implemented as a crystal reference frequency oscillator (TCXO) for the block 202. The block 216 may be implemented as a real time clock (RTC) oscillator. The block 216 may include a low drop out (LDO) regulator (not shown). The block 218 may implement a second surface acoustic wave (SAW) filter. The block 220 may be implemented as a non-volatile memory. In one example, the block 220 may be implemented external to the block 202. The block 220 may store operating software and/or data for the block 202. In one example, the block 220 may be implemented as an electrically erasable programmable read only memory (EEPROM). However, other types of memory may be implemented accordingly to meet the design criteria of a particular implementation. The block 222 may be implemented as a dual low drop out (LDO) regulator. In one example, the block 222 may be implemented as a 3.3V power circuit. The block 222 may provide one or more regulated voltages to (i) a RF front end of the block 202 and (ii) a baseband portion of the block 202. In some embodiments, the blocks 202 and 210-222 are implemented as part of the electronics of the vehicle. In some embodiments, the blocks 202 and 210-222 are implemented as part of the dongle 90.

The blocks 230a-230n may implement a number of interface and support modules. In one example, the blocks 230a-230n may comprise an optional cellular modem interface 230a, an interface 230b providing support for wireless communication using one or more protocols (e.g., IEEE 802.11x (WiFi), IEEE 802.15.1 Bluetooth®, etc.), an interface 230c providing support for one or more wired communication protocols (e.g., USB, Ethernet, etc.), a non-volatile memory (NVM) interface 230d, and/or random access memory (RAM) interfaces 230e and/or 230n. In one example, the cellular modem interface 230a may be configured to connect with an external antenna. In another example, the cellular modem interface 230a may include a cellular multi-band antenna disposed on a layer of the printed circuit board substrate used to implement the system 200. In various embodiments, some of the blocks 230a-230n may be omitted.

The NVM interface 230d may be implemented, for example, to connect one or more serial flash devices to the block 204. In some embodiments, the NVM interface 230d connects a 4M×8 quad serial flash device to the block 204. In one example, the NVM interface 230d connects NVM modules storing map data to be used with signals processed by the system 200. The RAM interface 230e may be configured to connect synchronous dynamic random access memory (SDRAM) to the block 204. In one example, the SDRAM may comprise a number (e.g., eight) of zero wait state, 16 or 32 bit memory devices which may be connected to the block 204. In some embodiments, the SDRAM may be implemented with 64 MB memory devices. The block 230n may provide for one or more additional interfaces (e.g., memory sockets for additional memory, etc.).

The block 232 may be implemented, in one example, as an optional memory socket for connecting one or more non-volatile memory devices. In one example, the block 232 may be configured to accept FLASH memory devices (e.g., 8-8GB, 8-32 bit) and/or memory cards (e.g., SD cards, etc.). In one example, the memory devices may contain map data to be used with signals processed by the system 100. The block 234 may implement one or more optional debug ports. The block 236 may implement a 3-axis gyroscope or accelerometer. The block 240 may be implemented, in one example, as an electrical connector capable of connecting to an electronic system bus of a vehicle (e.g., an OBD-II connector). The connector 240 may have a sufficient number of pins to allow the system 200 to connect to more than one bus of a vehicle. The block 242 may implement a main power supply for the system 200. In one example, the block 242 may be implemented as a LDO regulator with delay start. The block 244 may implement a low voltage power circuit for the system 200. The block 250 may be implemented as a battery monitoring circuit.

The block 202 may be implemented, in one example, with discrete surface mount devices (SMDs). In one example, the block 202 may be implemented similarly to GPS circuitry described in U.S. Pat. No. 6,272,349, issued Aug. 7, 2001, which is herein incorporated by reference in its entirety. In one example, the block 202 may include a first integrated circuit for converting radio frequency signals from the GPS/GNSS antenna 210 into intermediate frequency signals, and a second integrated circuit for performing operations on the intermediate frequency signals to produce GPS (or other GNSS) signals that can be communicated to the auxiliary device. In one example, the GPS/GNSS antenna 210 may be configured for receive-only operation of low level GPS satellite signals. The filter 212 may be implemented, in one example, as a passband filter operating at L1 GPS (e.g., 1575.42±25 MHZ). However, other filters may be implemented depending on the particular GPS/GNSS signals and bandwidth implemented. The filter 212 may be configured to attenuate unwanted out-of-band RF signals to the block 202 and periphery circuitry. The block 202 may include a low noise amplifier (LNA) circuit to amplify low level GPS/GNSS signals received by the system 200 with a low signal-to-noise ratio (SNR). The block 214 generally provides a crystal controlled reference frequency signal to the block 202. The block 202 generally receives and processes the GPS/GNSS signals. The block 220 may provide data storage for last known satellite fixes, module ID storage, etc.

In one example, the block 212 may be optional. For example, depending on the application, the block 212 may be omitted. In one example, the block 202 may be implemented with an internal filter. For example, a GPS chipset may have an internal amplifier, filter, and automatic gain control already incorporated (e.g., in connection with anti-jamming capabilities). However, the inclusion of anti-jamming capabilities may affect dead reckoning (DR) performance of the GPS chipset. Dead reckoning generally refers to a process of estimating a current position based upon a previously determined position, or fix, and advancing that position based upon known or estimated speeds (e.g., from sensors within a vehicle) over an elapsed time, and course.

The optional cellular modem interface 230a may be configured as a cellular transceiver for reception and transmission of mobile telephony signals. In one example, the optional cellular modem interface 230a may include an antenna configured for operation with a GSM (Global System for Mobile Communications:
originally Groupe Special Mobile) mobile telephony system. The antenna and the cellular modem may support, in one example, GSM cellular telephone and General Packet Radio Service (GPRS) communication protocols. The cellular modem interface 230a may operate with signals in various GSM carrier ranges (e.g., 400/450 MHZ, 850/900 MHZ, 1800/1900 MHZ, etc.). For example, second generation (2G) GSM networks may operate in the 900 or 1800 MHZ bands. In locations where the 900 or 1800 MHZ bands are already allocated (e.g., in the U.S. and Canada), 850 and 1900 MHZ bands may be used.

GSM modem chips need to be licensed in every country in which the part is sold. When implemented, the optional cellular modem interface 230a may comprise a pre-certified (e.g., licensed) drop-in chip to keep costs down. The optional cellular modem interface 230a may be connected to the block 204. In addition to cellular telephony data, the optional cellular modem interface 230a may be configured to communicate assisted GPS (aGPS) related data to the system 200 and transmit GPS position information (e.g., using a National Marine Electronics Association (NMEA) standard format). In one example, the aGPS related data may be used to aid in the time to first fix by self-calculating a forward ephemeris using the data. In another example, the interface 230a may be used for mobile station based assistance to obtain precise time and/or receive orbital data or almanac for GNSS satellites enabling the system 200 to lock to satellites more rapidly. In still another example, the interface 230a may be used for mobile station assisted assistance (e.g., communicating GNSS information to a remote server for the server to process the information into a position and relay the position to the vehicle, taking advantage of surveyed coordinates of a cell tower and/or the cell tower having a better satellite signal, etc.).

The block 232 may be implemented, in one example, as a detachable smart card. In one example, the block 132 may implement a subscriber identity module (SIM). The block 232 may contain subscriber information and phonebook data for a user. The block 232 generally allows the user to change vehicles including embodiments of the present invention while retaining their information. Alternatively, the user may change carriers (e.g., cellular phone service providers), while retaining the vehicle, simply by changing the block 232.

The controller 206 generally connects with the block 202, the block 204 and the block 208. The block 208 may implement a CAN transceiver with discrete surface mounted devices. The CAN transceiver 208 generally provides a transceiver interface to the CAN bus of the vehicle via the connector 240. However, other system busses and transceiver interfaces may be implemented accordingly to meet the design criteria of a particular implementation. The system 200 may also include a main power supply 242 that may receive a power supply from the vehicle (e.g., alternator, battery, etc.). In one example, the power supply 242 may be designed to work in vehicles with power supplies ranging from 12 to 48 Volts. However, other supply voltages may be implemented to meet the design criteria of a particular implementation. An optional back-up battery (not shown) may be implemented also to make the system 200 more robust.

Figure 5:
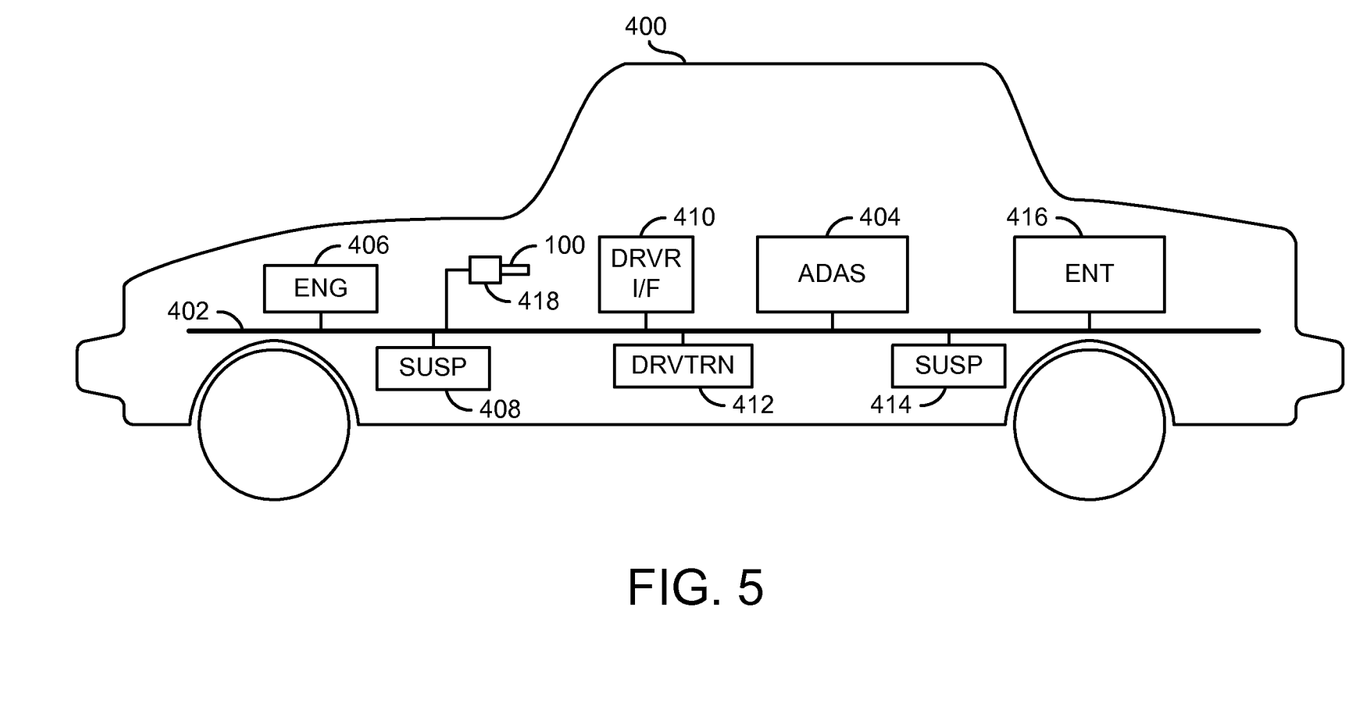
FIG. 5 is a diagram illustrating an example application in accordance with an embodiment of the invention.

Referring to FIG. 5, a diagram is shown illustrating an example application of a OBD-II device in accordance with an embodiment of the invention. A vehicle 400 may include one or more system busses 402 (e.g., a CAN bus, data bus, etc.), an advanced driver assistance system (ADAS) 404, and a number of sensors and/or actuators distributed around the vehicle. The term sensor generally refers to a device that generates a signal representative of a sensed condition (e.g., temperature, level, position, speed, etc.). The term actuator generally refers to a device that is configured to control a parameter or object in response to a control signal (e.g., solenoid, heater, lamp, etc.). The sensors and/or actuators may include, but are not limited to, engine-related devices 406, front suspension related devices 408, driver interface devices 410, drive train related device 412, rear suspension related devices 414, and entertainment related systems 416. An on board diagnostic (e.g., OBD-II, etc.) port 418 may provide convenient (e.g., just under the dashboard) access to the various vehicle busses 402 allowing connection of the PCB 100.

Figure 6:
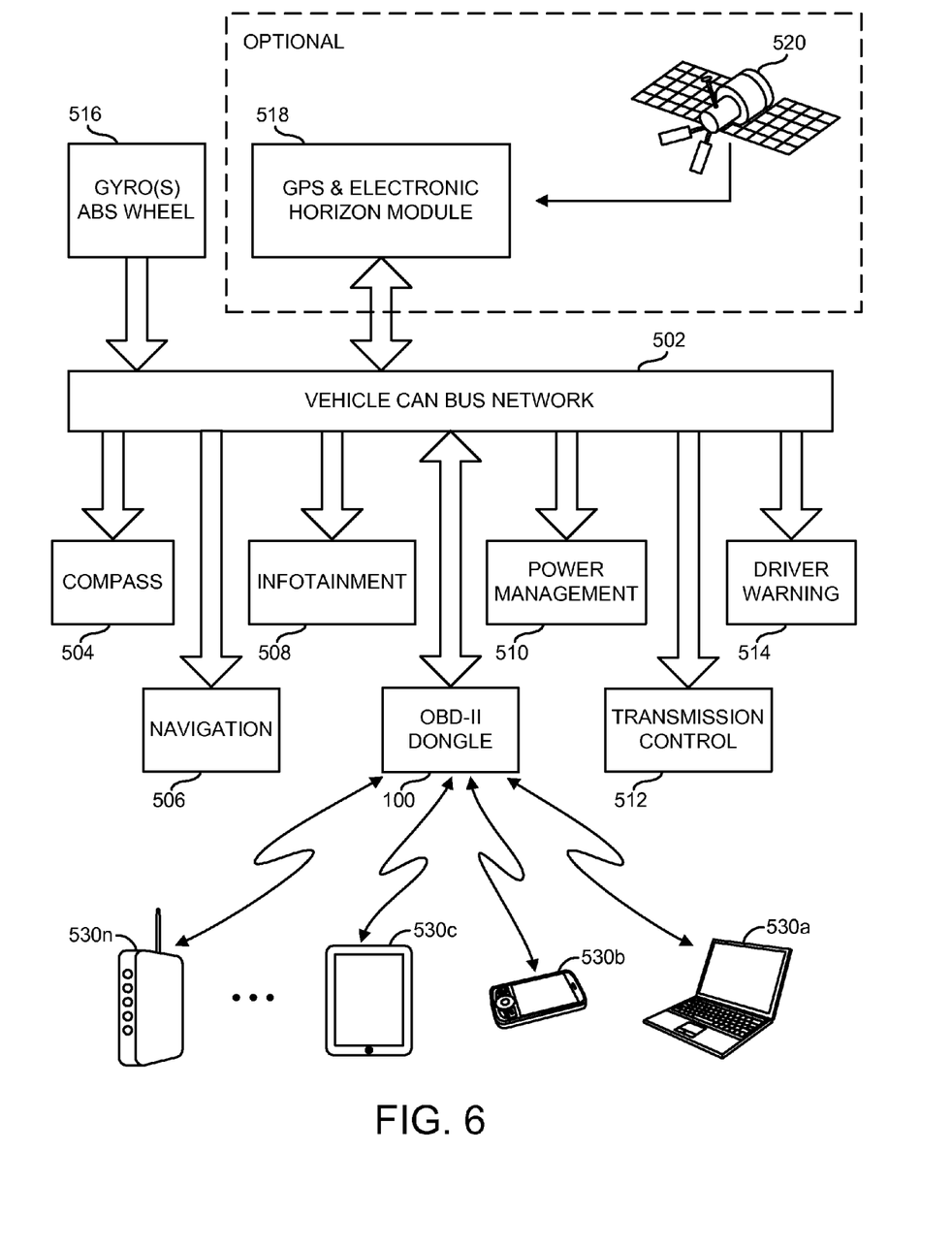
FIG. 6 is a diagram illustrating example data flows in a system in accordance with an embodiment of the invention.

Referring to FIG. 6, a diagram illustrating example data flows in accordance with an embodiment of the invention is shown. In various embodiments, a vehicle electronic systems bus (network) 502 communicates data among multiple vehicle systems. The data provided by the vehicle electronic systems bus (network) 502 may be utilized by devices and/or applications including, but not limited to compass 504, navigation 506, infotainment 508, power management 510, transmission (drive train) control 512, and driver warning 514. The data provided by the vehicle electronic systems bus (network) 502 may include information received from and/or based on sensors (e.g., gyros, ABS wheel, accelerometer, etc.) 516 and optional satellite broadcasts 518. In various embodiments, the PCB 100 in the dangle 90 enables application programs running on one or more auxiliary devices 530a-530n to obtain highly accurate location information using information from the vehicle electronic systems bus (network) 502.

Figure 7:
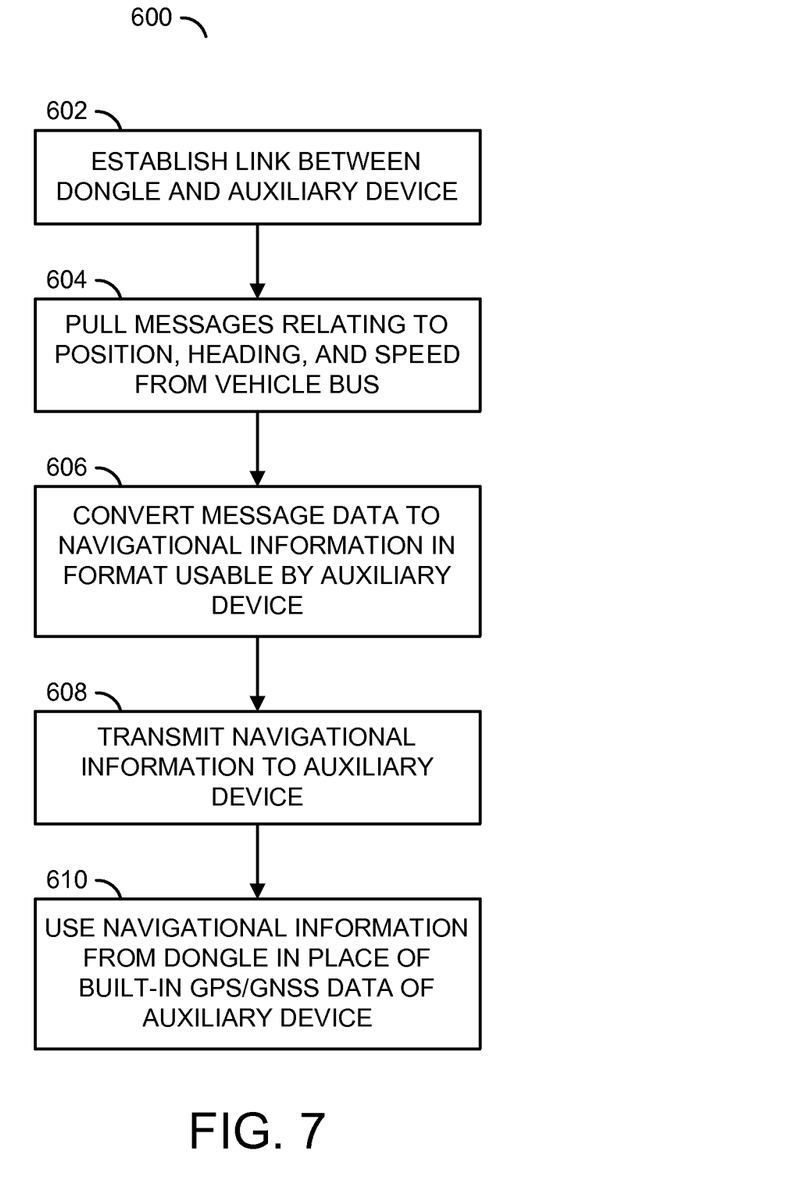
FIG. 7 is a flow diagram illustrating an example process in accordance with an example embodiment of the invention.

Referring to FIG. 7, a flow diagram is shown illustrating a process in accordance with an embodiment of the invention. In embodiments used with vehicles having built-in GPS/GNSS capability, a process 600 may be implemented. The process (or method) 600 may comprise a step (or state) 602, a step (or state) 604, a step (or state) 606, a step (or state) 608, and a step (or state) 610. In the step 602, with the dongle 90 plugged into the on board diagnostic port of the vehicle, a wireless (e.g., WiFi, BT, etc.)

or wired (e.g., Ethernet, USB, etc.) link may be established between the dongle and an auxiliary device (e.g., smart phone, tablet, etc.). In some embodiments, the wireless link may be automatically established when the auxiliary device is within range of the dangle. In some embodiments, the auxiliary device may be configured to initiate the link when one or more predetermined conditions are met (e.g., input via a user interface, trigger by a near field communication (NFC) signal, cable connection, etc.).

Figure 8:
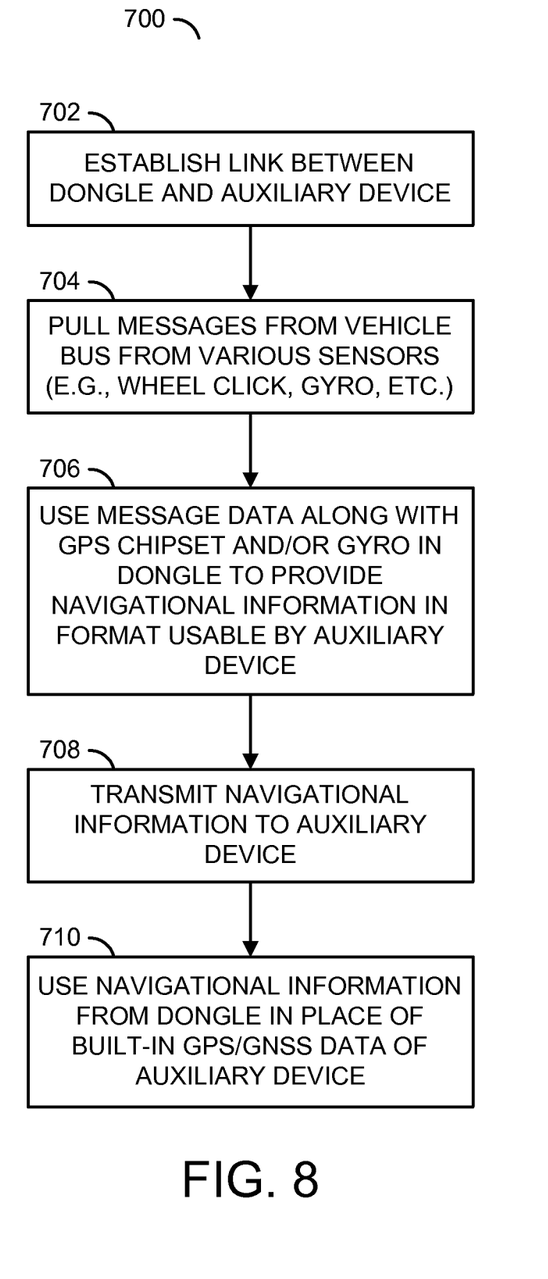
FIG. 8 is a flow diagram illustrating another example process in accordance with an example embodiment of the invention.

Once the link with the dangle is established, a built-in GPS/GNSS capability of the auxiliary device may be disabled. For example, location services provided by an operating system of the auxiliary device may be configured to respond to applications with the externally provided navigational data instead of internally generated GPS/GNSS data. In the step 604, the process 600 pulls messages relating to position, heading, speed, etc. from the vehicle bus or busses. In the step 606, the dangle converts the message data pulled from the vehicle into navigational information in a format usable by the auxiliary device (e.g., National Marine Electronics Association (NMEA) standard format, etc.). In the step 608, the dangle transmits the navigational information to the auxiliary device using the wireless or wired link. In the step 610, the auxiliary device uses the navigational information received from the dongle in place of less accurate internal GPS/GNSS or coarse WiFi location information. In one example, the steps 604-610 may be performed continuously. In another example, the steps 604-610 may be performed in response to commands (or requests) received from the auxiliary device (e.g., using a command language such as AT or Hayes commands). Referring to FIG. 8, a flow diagram is shown illustrating another process in accordance with an embodiment of the invention. In embodiments used with vehicles lacking built-in GPS/GNSS capability, a process 700 may be implemented. The process (or method) 700 may comprise a step (or state) 702, a step (or state) 704, a step (or state) 706, a step (or state) 708, and a step (or state) 710. In the step 702, with the dongle 90 plugged into the on board diagnostic port of the vehicle, a wireless (e.g., WiFi, BT, etc.) or wired (e.g., USB, Ethernet, etc.) link may be established between the dongle and an auxiliary device. In some embodiments, the link may be automatically established when the auxiliary device is within range of the dangle. In some embodiments, the auxiliary device maybe configured to initiate the link when one or more predetermined conditions are met (e.g., connection of dongle to OBD-II port, input via a user interface, trigger by a near field communication (NFC) signal, connection of a cable, etc.).

Once the link with the dongle is established, a built-in GPS/GNSS capability of the auxiliary device may be disabled and the process 700 may move to the step 704. In the step 704, the process 700 pulls messages from various motion-related sensors (e.g., ABS wheel, wheel click, gyro, RPM, speed, etc.) from the vehicle bus or busses. In the step 706, the dongle uses data from the messages along with the GPS/GNSS chipset, 3-axis gyroscope, and/or accelerometer to generate navigational information. The navigational information may be derived with or without dead reckoning (DR) position solutions depending on the particular implementation. The dongle formats the navigational information for use by the auxiliary device (e.g., using National Marine Electronics Association (NMEA) standard format, etc.). In the step 708, the dongle transmits the navigational information (with or without DR or 3D DR position information) to the auxiliary device using the wireless or wired link. In the step 710, the auxiliary device uses the navigational information received from the dongle in place of less accurate internal GPS/GNSS or coarse WiFi information. In one example, the steps 704-710 may be performed continuously. In another example, the steps 704-710 may be performed in response to commands (or requests) received from the auxiliary device (e.g., using a command language such as AT or Hayes commands).

While the invention has been particularly shown and described with reference to the preferred embodiments thereof, it will be understood by those skilled in the art that various changes in form and details may be made without departing from the scope of the invention.

The invention claimed is:

1. A system comprising:
a processor circuit configured to be plugged into an on board diagnostic connector of a vehicle;
an auxiliary device configured to operate independently of said vehicle, enabled to generate positional data internally using at least one of satellite signals and Wi-Fi location information, and enabled to establish a link with said processor circuit;
wherein, (i) upon establishing said link with said processor circuit, location services provided by an operating system of said auxiliary device respond to applications running on said auxiliary device with navigational information provided by said processing circuit instead of the internally generated positional data and (ii) the navigational information provided by said processing circuit is more accurate than the positional data the auxiliary device is enabled to generate internally; and
a computer readable storage medium embodying computer executable instructions, wherein said computer executable instructions, when executed by said processor circuit, enable said processor circuit to (i) communicate with one or more busses of said vehicle via said on board diagnostic connector, (ii) generate said navigational information using one or more of said satellite signals and motion-related information obtained by said processing circuit from said one or more busses of said vehicle, (iii) convert said navigational information to a format usable by said auxiliary device, and (iv) communicate said navigational information to said auxiliary device via said link.

2. The system according to claim 1, wherein said on board diagnostic connector comprises an OBD-II compliant port.

3. The system according to claim 1, wherein said processor circuit, said computer readable storage medium, and a wireless or wired communication interface are housed in a dongle.

4. The system according to claim 3, wherein said dongle and said auxiliary device communicate using one or more wireless or wired protocols.

5. The system according to claim 4, wherein said one or more wireless or wired protocols comprise at least one of IEEE 802.11 a/b/g/n "Wi-Fi", IEEE 802.15.1 BLUETOOTH, IEEE 802.15.4 ZIGBEE, universal serial bus, and Ethernet.

6. The system according to claim 3, further comprising a second computer readable storage medium embodying a second set of computer executable instructions, wherein said second set of computer executable instructions, when executed by a computer-based device, enable said computer-based device to communicate as the auxiliary device with said dongle to provide said computer-based device with said navigational information.

7. The system according to claim 6, wherein said second set of computer executable instructions is configured to augment a coarse location determining capability of said computer-based device while located remotely from said processor circuit.

8. The system according to claim 6, wherein said navigational information received from said dongle is used in place of an internal navigation capability of said computer-based device.

9. The system according to claim 3, wherein said processor circuit and one or more interface circuits are disposed on a printed circuit board in said dongle, said one or more interface circuits implement one or more wireless or wired protocols, and said processor circuit is configured to communicate said navigational information to one or more auxiliary devices using the one or more interface circuits.

10. The system according to claim 9, wherein said dongle further comprises a GPS/GNSS chipset disposed on said printed circuit board and electrically connected with said processor circuit.

11. A method of providing highly accurate navigational information to a computer-based device configured to operate independently of a vehicle, said method comprising the steps of:
connecting a dongle to an on board diagnostic port of said vehicle;
enabling an application program stored on said computer-based device;
establishing a communication link between said application program and said dongle connected to said on board diagnostic port of said vehicle;
generating navigational information using one or more of satellite signals and motion-related information pulled from one or more busses of said vehicle via said on board diagnostic port of said vehicle;
converting said navigational information to a format usable by said application program;
communicating said navigational information to said computer-based device via said communication link; and
responding to application programs running on said computer-based device with said navigational information received via said communication link instead of with positional data generated internally by said computer-based device, wherein said navigational information received via said communication link is more accurate than said positioned data internally generated by said computer-based device.

12. The method according to claim 11, further comprising:

augmenting a location determining capability of said computer-based device using the navigational information obtained from the dongle.

13. The method according to claim 11, wherein said navigational information comprises at least one of position information and motion-related information derived from at least one of global positioning system data, global navigation satellite system data, and messages obtained from an electronic data bus of said vehicle.

14. The method according to claim 13, wherein the position or motion-related information obtained from the dongle further comprises at least one of dead reckoning (DR) position information and three-dimensional (3D) DR position information.

15. The method according to claim 13, wherein message data obtained from the electronic data bus of said vehicle comprises one or more of heading, speed, and location.

16. The method according to claim 15, wherein said message data obtained from the electronic data bus of said vehicle is generated by one or more sensors of said vehicle.

17. The method according to claim 11, further comprising disabling an on board navigation capability of said computer-based device in favor of the navigational information received from said dongle.

18. The method according to claim 11, further comprising communicating dead reckoning (DR) or three-dimensional (3D) DR information to said computer-based device using a wireless or wired protocol.

19. The method according to claim 11, wherein said navigational information comprises one or more of position information and motion-related information continuously obtained from an electronic data bus of said vehicle.

20. The method according to claim 11, wherein said navigational information comprises one or more of position information and motion-related information obtained from an electronic data bus of said vehicle in response to requests received from said computer-based device.

* * * * *